United States Patent
Guo et al.

(10) Patent No.: US 12,475,535 B2
(45) Date of Patent: Nov. 18, 2025

(54) IMAGE PROCESSING DEVICE, ELECTRONIC DEVICE HAVING THE SAME, AND OPERATING METHOD THEREOF

(71) Applicant: SAMSUNG ELECTRONICS CO., LTD., Suwon-si (KR)

(72) Inventors: Kai Guo, Suwon-si (KR); Seungwon Choi, Suwon-si (KR); Jongseong Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 394 days.

(21) Appl. No.: 18/305,625

(22) Filed: Apr. 24, 2023

(65) Prior Publication Data
US 2024/0095883 A1 Mar. 21, 2024

(30) Foreign Application Priority Data
Sep. 19, 2022 (KR) .................. 10-2022-0117905

(51) Int. Cl.
*G06T 5/50* (2006.01)
*G06T 5/70* (2024.01)

(52) U.S. Cl.
CPC .................. *G06T 5/50* (2013.01); *G06T 5/70* (2024.01); *G06T 2207/10016* (2013.01);
(Continued)

(58) Field of Classification Search
CPC ... G06T 5/50; G06T 5/70; G06T 2207/10016; G06T 2207/20081; G06T 2207/20084; G06T 2207/20221; G06T 5/60; G06T 2207/20182; G06T 3/4046; G06T 9/002; G06T 2207/20076; G06T 5/20; G06T 7/38; G06T 7/92; G06T 7/215; G06T 2207/20012; G06T 2207/20208; G06N 3/0464; G06N 3/02; G06N 3/08–088; G06N 3/0445; G06N 3/0454; G06N 3/4046; G06N 3/4053; G06N 7/00; G06N 7/01; G06N 20/00; G06K 7/1482; G06V 10/454; G06V 10/54; G06V 10/774; G06V 10/82; G06V 20/41; G06V 30/18057; G06V 20/698; G06V 30/19173; G06V 10/30; G06V 30/164; G06F 18/214; G06F 18/22; G06F 18/241; G06F 18/24; G06F 18/2411; G06F 18/2415; G06F 30/27; Y10S 128/925; H04N 23/67; H04N 23/80

See application file for complete search history.

(56) References Cited

U.S. PATENT DOCUMENTS 9,449,371 B1 9/2016 Sheng et al.
9,769,493 B1 9/2017 Yang et al.
(Continued)

*Primary Examiner* — Jose L Couso
(74) *Attorney, Agent, or Firm* — Morgan, Lewis & Bockius LLP

(57) ABSTRACT

A method includes acquiring a current frame, a noise dispersion map for the current frame, and a first denoised frame for a previous frame; generating a weighted first denoised frame based on the noise dispersion map, the current frame, and the first denoised frame using a first neural network; generating an initial fused image based on the current frame and the weighted first denoised frame using a second neural network; and generating a second denoised frame for the current frame based on the initial fused image using a third neural network.

20 Claims, 13 Drawing Sheets

(52) U.S. Cl.
CPC .............. *G06T 2207/20081* (2013.01); *G06T 2207/20084* (2013.01); *G06T 2207/20221* (2013.01)

(56) References Cited

U.S. PATENT DOCUMENTS

| | | | |
|---|---|---|---|
| 10,572,979 B2* | 2/2020 | Vogels | G06F 18/2113 |
| 11,151,695 B1 | 10/2021 | Mihal et al. | |
| 11,151,702 B1 | 10/2021 | Tico et al. | |
| 11,257,189 B2 | 2/2022 | Park et al. | |
| 11,790,492 B1* | 10/2023 | Ahmad | G06N 3/0495 |
| 11,900,566 B1* | 2/2024 | Ferrés | G06T 5/70 |
| 2010/0220939 A1 | 9/2010 | Tourapis et al. | |
| 2017/0220854 A1 | 8/2017 | Yang et al. | |
| 2019/0180418 A1* | 6/2019 | Kuybeda | G06T 5/60 |
| 2019/0304069 A1* | 10/2019 | Vogels | G06T 15/06 |
| 2020/0357099 A1* | 11/2020 | Long | G06T 5/77 |
| 2020/0364834 A1 | 11/2020 | Ferrés et al. | |
| 2021/0327031 A1* | 10/2021 | Xie | G06T 5/70 |
| 2022/0215510 A1* | 7/2022 | Weinmann | G06T 5/70 |

\* cited by examiner

IMAGE PROCESSING DEVICE, ELECTRONIC DEVICE HAVING THE SAME, AND OPERATING METHOD THEREOF

CROSS-REFERENCE TO RELATED APPLICATION(S)

This application claims the benefit under 35 USC 119(a) to Korean Patent Application No. 10-2022-0117905, filed on Sep. 19, 2022, in the Korean Intellectual Property Office, the disclosure of which is incorporated by reference herein in its entirety.

BACKGROUND

Embodiments of the present disclosure relate to image processing, and more specifically denoising images using machine learning.

With the increasing demand for high-quality and high-definition photos and videos, image sensors are now designed with smaller pixel sizes and greater integration density. However, some pixels in these image sensors may be faulty or non-functional, leading to a degradation in overall image quality. Accordingly, there is a need for correcting pixel data output including pixel data output from faulty pixels.

SUMMARY

The present disclosure describes an image processing device for performing denoising using a neural network, an electronic device having the same, and an operating method thereof.

According to embodiments of the present disclosure, a method includes acquiring a current frame, a noise dispersion map for the current frame, and a first denoised frame for a previous frame; generating a weighted first denoised frame based on the noise dispersion map, the current frame, and the first denoised frame using a first neural network; generating an initial fused image based on the current frame and the weighted first denoised frame using a second neural network; and generating a second denoised frame for the current frame based on the initial fused image using a third neural network.

According to embodiments of the present disclosure, an image processing device includes a processor configured to execute a denoising module; and a memory device configured to store the denoising module. The denoising module includes a first neural network for generating a weighted frame for a denoised frame for a previous frame; a second neural network for generating an initial fused image for the weighted frame using a current frame and the weighted frame; and a third neural network for fusing the current frame, the initial fused image, and the denoised frame for the previous frame.

According to embodiments of the present disclosure, an electronic device includes a memory device configured to store a denoising module removing video/multi-frame noise; a memory controller configured to control the memory device; and a processor configured to execute the denoising module removing noise from an input image. The denoising module performs a recurrent three-stage gradual temporal fusion using a convolutional neural network (CNN).

According to embodiments of the present disclosure, a method includes generating a first denoised frame for a first frame of a video using a multi-stage neural network; generating an initial fused image based on the first denoised frame and a second frame of the video using the multi-stage neural network; and generating a second denoised frame for the second frame using the multi-stage neural network.

DETAILED DESCRIPTION

Embodiments of the present disclosure relate to image processing, and more specifically denoising images using machine learning.

Faulty or non-functional pixels negatively impact the quality of images and videos. Neural networks may be used to correct noise caused by faulty pixels and other causes. In some examples, neural networks are trained to improve the quality of images and videos using training data including sample images, noise maps, and corresponding original images. In some cases, training neural networks uses large datasets training data, and the training can be time-consuming and resource intensive.

Embodiments of the present disclosure provide systems and methods for using neural networks (e.g., a recurrent multiple-stage neural network) to effectively remove noise while preserving image details. Some embodiments incorporate information from denoised frame for a previous frame, and therefore achieve a better prediction of the noise in the current frame and generate more accurate denoising results. In some examples, a recursive fusion method enables a gradual and more precise adjustment of weights of the neural networks, leading to a better preservation of image details.

In an image processing device according to an example embodiment, video or multi-frame image noise may be removed using recurrent multi-stage gradual temporal fusion. In some examples, a neural network may be used in each stage in a repetitive 3-stage gradual temporal fusion. In an image processing device, an electronic device having the same, and an operating method thereof according to an example embodiment, by using recurrent 3-stage gradual temporal fusion in video/multi-frame denoising, denoising may be effectively performed while maintaining image details.

Figure 1:
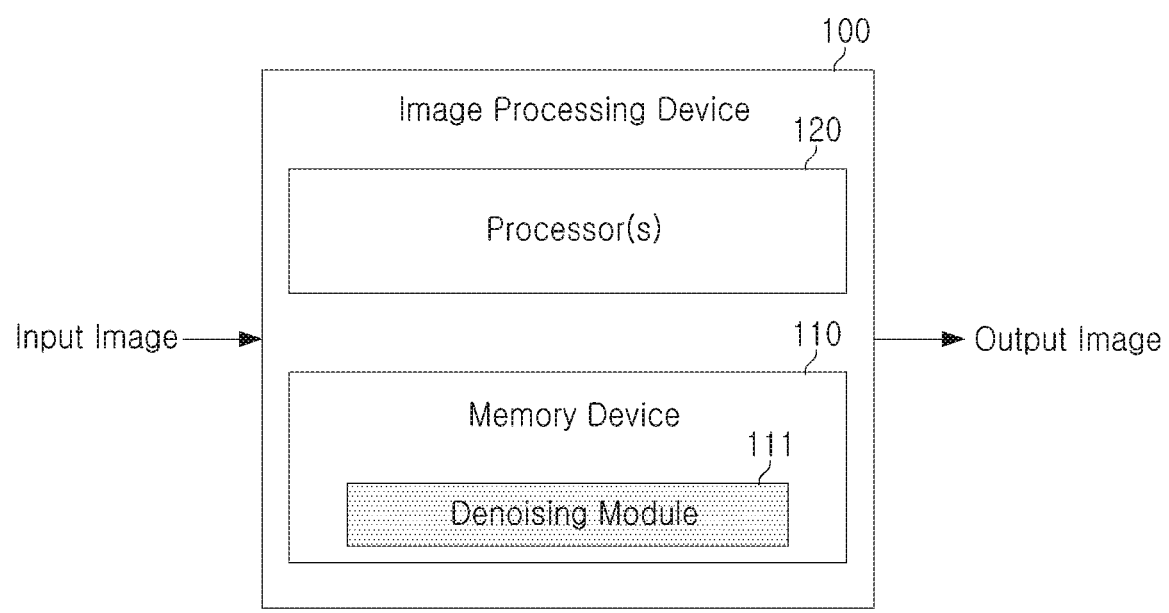
FIG. 1 is a diagram illustrating an image processing device according to an example embodiment.

FIG. 1 is a diagram illustrating an image processing device 100 according to an example embodiment. Referring to FIG. 1, the image processing device 100 may include a memory device 110 and at least one processor 120.

The memory device 110 may be electrically connected to the processor 120 and may be implemented to store data used for driving. For example, the memory device 110 may be implemented as an internal memory such as a read only memory (ROM) (e.g., electrically erasable programmable read-only memory (EEPROM)) or a random-access memory (RAM) included in the processor 120, or may be implemented as a separate memory from the processor 120. The memory device 110 is implemented in the form of a memory embedded in the image processing device 100 according to data storage uses, or may also be implemented in the form of a memory that may be attached to or detached from the image processing device 100. For example, data for driving the electronic device 100 is stored in a memory embedded in the image processing device 100, and data for an extended function of the image processing device 100 may be stored in a memory attachable to or detachable from the image processing device 100.

According to some embodiments, for example, a memory embedded in the image processing device 100 may be implemented as at least one of a volatile memory (such as dynamic RAM (DRAM), static RAM (SRAM), or synchronous dynamic RAM (SDRAM)), a non-volatile memory (e.g., one time programmable ROM (OTPROM), programmable ROM (PROM), erasable and programmable ROM (EPROM), electrically erasable and programmable ROM (EEPROM), mask ROM, flash ROM, flash Memory (such as NAND flash or NOR flash), hard drive, or solid state drive (SSD). A memory that may be attached to and detached from the image processing device 100 may be implemented in the form of a memory card (e.g., compact flash (CF), secure digital (SD), micro secure digital (Micro-SD), mini secure digital (Mini-SD), extreme digital (xD), multi-media card (MMC), or the like), or an external memory (e.g., USB memory) connectable to the USB port.

Also, the memory device 110 may store an artificial neural network (ANN) used to improve the quality of an input image. In this case, the artificial neural network may be a machine learning model trained based on a plurality of sample images, a noise map for each sample image, and an original image corresponding to each sample image.

An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

In some examples, the ANN may be a Convolution Neural Network (CNN) model trained on a plurality of sample images, a noise map for each sample image, and an original image corresponding to each sample image.

A convolution neural network (CNN) is a class of neural network that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

A CNN can be a multilayer neural network with a special connection structure designed for voice processing, image processing, and the like. However, the ANN is not limited to a CNN architecture, and may be based on other models such as a recurrent neural network (RNN) or one of a wide variety of other deep neural networks (DNNs).

An RNN is a class of ANN in which connections between nodes form a directed graph along an ordered (i.e., a temporal) sequence. This enables an RNN to model temporally dynamic behavior such as predicting what element should come next in a sequence. Thus, an RNN is suitable for tasks that involve ordered sequences such as text recognition (where words are ordered in a sentence). The term RNN may include finite impulse recurrent networks (characterized by nodes forming a directed acyclic graph), and infinite impulse recurrent networks (characterized by nodes forming a directed cyclic graph).

According to some embodiments, the memory device 100 may store a denoising module 111. The denoising module 111 may maintain detailed edge processing and texture while removing noise of the input image using a neural network. In some examples, the denoising module 111 may effectively remove noise while maintaining detailed images using recurrent 3-stage gradual temporal fusion.

At least one processor 120 may be electrically connected to the memory device 110 to control overall operations of the image processing device 100. The processor 120 may be implemented as a microprocessor, a timing controller (T-CON), or a digital signal processor (DSP) processing a digital image signal, but the present disclosure is not limited thereto. For example, the processor 120 may include one or more of a central processing unit (CPU), a micro controller unit (MCU), a micro processing unit (MPU), a controller, an application processor (AP), or a communication processor (CP), and an ARM processor, or may be defined by the corresponding term. In addition, the processor 120 may be implemented as a System on Chip (SoC) or a large-scale integration (LSI) in which a processing algorithm is embedded, and may also be implemented in the form of a Field Programmable Gate Array (FPGA).

The processor 120 may generate an output image with increased image quality based on the input image. In some examples, the processor 120 may obtain a noise map representing the quality of the input image from the input image, and obtain an output image with improved quality of the input image by applying the input image and the noise map to an artificial neural network including a plurality of layers.

As the noise map obtained from the input image is used in the quality improvement process of the input image, quality improvement is performed adaptively according to the type of the input image, and the quality improvement effect may be improved. In this case, the artificial neural network may be an artificial intelligence model obtained by learning a relationship between a plurality of sample images, a noise map for each sample image, and an original image corresponding to each sample image through an artificial intelligence algorithm. Also, the plurality of layers of the artificial neural network may include an input layer, an intermediate layer, and an output layer. The input layer is the layer in which the operation is performed first among the plurality of layers, and the output layer is the layer in which the operation is performed last among the plurality of layers. The intermediate layer may be a layer disposed between the input layer and the output layer.

Also, the processor 120 may be implemented to drive the denoising module 111 by performing at least one instruction. The denoising module 111 may perform Temporal Noise Reduction (TNR). In general, TNR may be used in an Image Signal Processor (ISP) for video taken under more than one lighting conditions. In some cases, TNR is based on recursive integration. In some cases, classical image processing methods (e.g., HWTNR of routes) or deep learning methods (e.g., DLFE of routes) are used to compute fusion weight maps, and then, according to the estimated weights, outputs of the current frame and of the previous frame are fused.

Regarding noisy scenes in low light conditions, a general technique is increasing the fusion weight of the output of the previous frame to better remove the noise. In some examples, the output of the previous frame is referred to as the first denoised frame for the previous frame. However, this TNR technique has side effects such as image detail loss and local motion fusion artifacts. There is a need for TNR with more powerful denoising capabilities. Embodiments of the present disclosure provides a three-stage gradual fusion deep learning network that improves denoising capabilities while preserving details and avoiding local motion artifacts.

The image processing device 100 according to an example embodiment of the present disclosure includes 3-stage gradual fusion deep learning networks, thereby effectively removing noise and maintaining detailed images at the same time.

Figure 2:
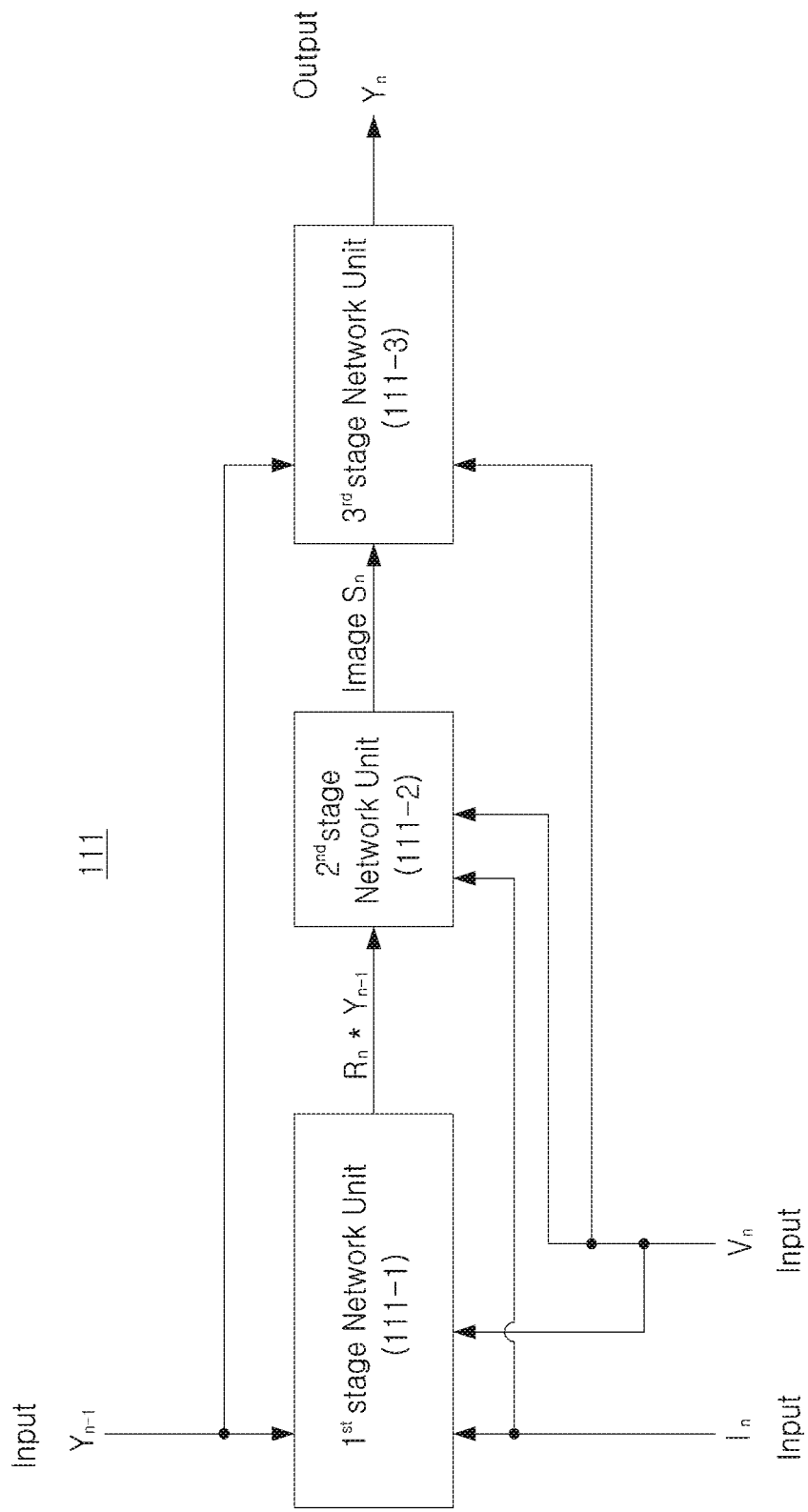
FIG. 2 is a diagram illustrating a denoising module according to an example embodiment.

FIG. 2 is a diagram illustrating the denoising module 111 according to an example embodiment of the present disclosure. The denoising module 111 uses a recursive fusion method in which the denoising output of the previous frame, the current frame, and the dispersion are used as inputs for generating the output of the current frame. The dispersion can be any measure of the deviation of the dataset including a standard deviation or a variance.

This process is repeated for each frame in sequence. The denoising module 111 uses a 3-stage gradual fusion method inside the fusion module. Each stage may be implemented using a neural network. Referring to FIG. 2, the denoising module 111 may include a first stage network unit 111-1, a second stage network unit 111-2, and a third stage network unit 111-3. The first stage network unit 111-1 may be a first neural network. The second stage network unit 111-2 may be a second neural network. The third stage network unit 111-3 may be a third neural network.

The first stage network unit 111-1 may identify a relevant part for denoising by predicting the gate weight $R_n$ using the first neural network and multiplying the output ($Y_{n-1}$) of the previous frame by the gate weight. The first neural network may use, as an input, an absolute value of a difference between the noise dispersion ($V_n$) of the current frame and the output ($Y_{n-1}$) of the previous frame, and the input ($I_n$) of the current frame. In an example embodiment, the first neural network may be implemented with a CNN including a sigmoid activation function.

The second stage network unit 111-2 may output an initial fused image ($S_n$) by fusing the weighted output ($R_n*Y_{n-1}$) of the previous frame, the input ($I_n$) of the current frame, and the noise dispersion ($V_n$) using a second neural network. In an example embodiment, the second neural network may be implemented as a CNN.

The third stage network unit 111-3 may predict the fusion weight to be used for fusing the initial fused image ($S_n$) of the second stage network unit 111-2 and the output ($Y_{n-1}$) of the previous frame using the third neural network. The third neural network may use the output ($Y_{n-1}$) of the previous frame, the noise dispersion ($V_n$) of the current frame, and the initial fused image ($S_n$) of the second stage network unit 111-2, as inputs. In an example embodiment, the third neural network may be implemented as CNN including a Sigmoid activation function.

As described above, the denoising module 111 according to an example embodiment may remove noise using the 3-stage gradual fusion method. The first stage network unit 111-1 may predict the first weight map using CNN. In this case, the predicted first weight map may identify useful information in the output ($Y_{n-1}$) of the previous frame that is relevant to the denoising. The second stage network unit 111-2 may output an initial fused image $S_n$ by fusing the current frame $I_n$ with the output $Y_{n-1}$ of the previous frame displayed using CNN. The third stage network unit 111-3 may predict the second weight map using CNN. In this case, the predicted second weight map may be used to fuse the initial fused image $S_n$ and the output $Y_{n-1}$ of the previous frame. The third stage network unit 111-3 may output a denoised frame for the current frame.

Figure 3:
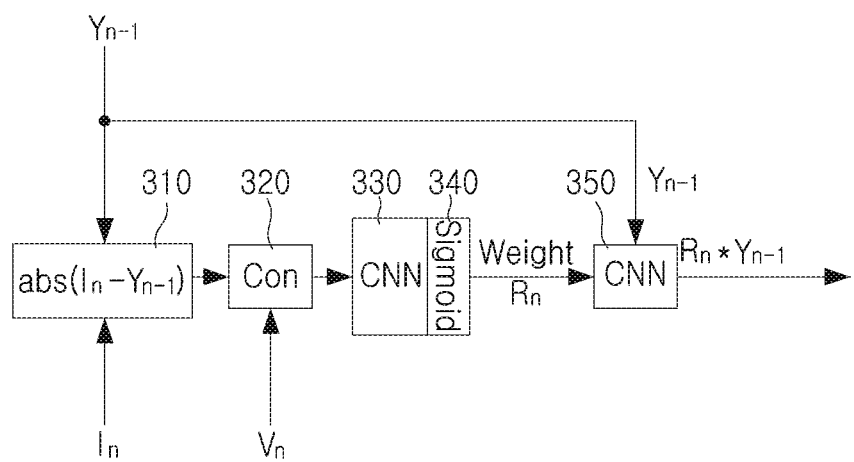
FIG. 3 is a diagram illustrating a first stage network unit according to an example embodiment.

FIG. 3 is a diagram illustrating a first stage network unit 111-1 according to an example embodiment of the present disclosure.

Referring to FIG. 3, the first stage network unit 111-1 may include an absolute value unit 310, a concatenation unit 320, a CNN unit 330, an activation function unit 340, and a multiplication unit 350.

The absolute value unit 310 may be implemented to output an absolute value of a difference between the current frame $I_n$ and the previous output frame $Y_{n-1}$. The concatenation unit 320 may be implemented to concatenate the output value of the absolute value unit 310 and the noise dispersion ($V_n$) of the current frame. The CNN unit 330 may be implemented to perform convolutional operations on the output of concatenation unit 320. The activation function unit 340 may be implemented to receive an output of the CNN unit 330 and output a weight $R_n$ using a sigmoid activation function. The multiplication unit 350 may be implemented to output the weighted output ($R_n*Y_{n-1}$) by multiplying the gate weight map ($R_n$) of the activation function unit 340 and the output ($Y_{n-1}$) of the previous frame.

The first stage network unit 111-1 may output a gate weighted output ($R_n*Y_{n-1}$) for the previous frame representing the useful content of the output ($Y_{n-1}$) of the previous frame using a CNN including a sigmoid activation function.

According to some embodiments, the noise dispersion map comprises one channel, the absolute value comprises three channels, and the first concatenated data comprises four channels. In some examples, generating a weighted first denoised frame includes applying the first neural network to the four channels of the first concatenated data.

Figure 4:
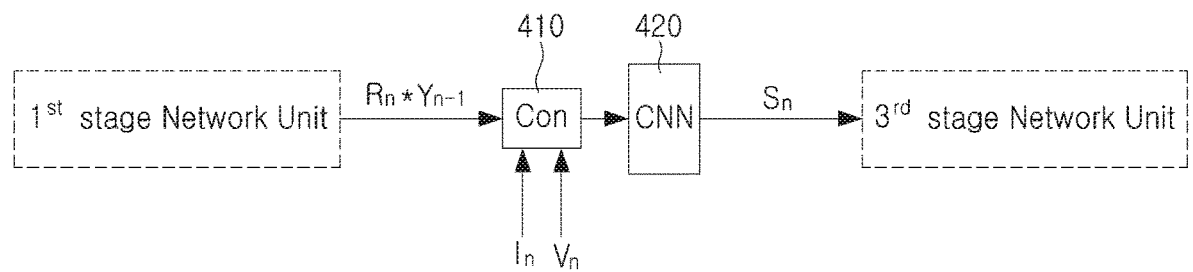
FIG. 4 is a diagram illustrating a second stage network unit according to an example embodiment.

FIG. 4 is a diagram illustrating a second stage network unit 111-2 according to an example embodiment. Referring to FIG. 4, the second stage network unit 111-2 may include a concatenation unit 410 and a CNN unit 420.

The concatenation unit 410 may be implemented to concatenate the gate weight and the weighted output ($R_n*Y_{n-1}$) from the first stage network unit 111-1, the current frame ($I_n$), and the noise dispersion ($V_n$). The CNN unit 420 may output an initial fused image $S_n$, by performing CNN on the output of the concatenation unit 410.

Figure 5:
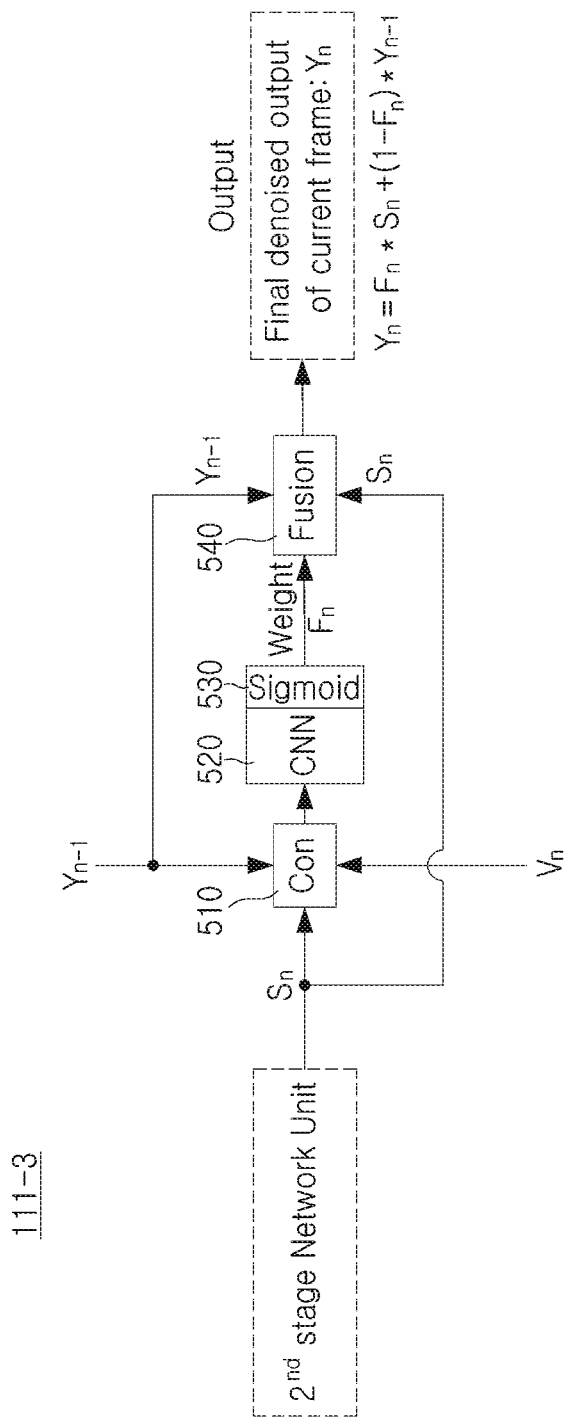
FIG. 5 is a diagram illustrating a third stage network unit according to an example embodiment.

FIG. 5 is a diagram illustrating a third stage network unit 111-3 according to an example embodiment of the present disclosure.

Referring to FIG. 5, the third stage network unit 111-3 may include a concatenation unit 510, a CNN unit 520, an activation function unit 530, and a fusion unit 540.

The concatenation unit 510 may be implemented to concatenate the initial fused image $S_n$ output from the second stage network unit 111-2, the current frame $I_n$, and the noise dispersion $V_n$. The CNN unit 520 may be implemented to perform convolutional operations on the output of the concatenation unit 510. The activation function unit 530 may be implemented to output the fusion weight $F_n$ for the output of the CNN unit 520 using a sigmoid activation function. The fusion unit 540 may be implemented to receive the initial fused image (S n), the previous output frame ($Y_{n-1}$), and the fusion weight ($F_n$) and to output the final denoised value ($Y_n=F_n*S_n+(1-F_n)*Y_{n-1}$) of the current frame ($I_n$).

The third stage network unit 111-3 may predict the fusion weight $F_n$ used to fuse the initial fused image $S_n$ and the output $Y_{n-1}$ of the previous frame using a CNN including a sigmoid activation function.

According to some embodiments, generating the initial fused image includes concatenating the current frame, the noise dispersion map, and the weighted first denoised frame to obtain second concatenated data, and generating the initial fused image based on the second concatenated data using the second neural network.

Figure 6A:
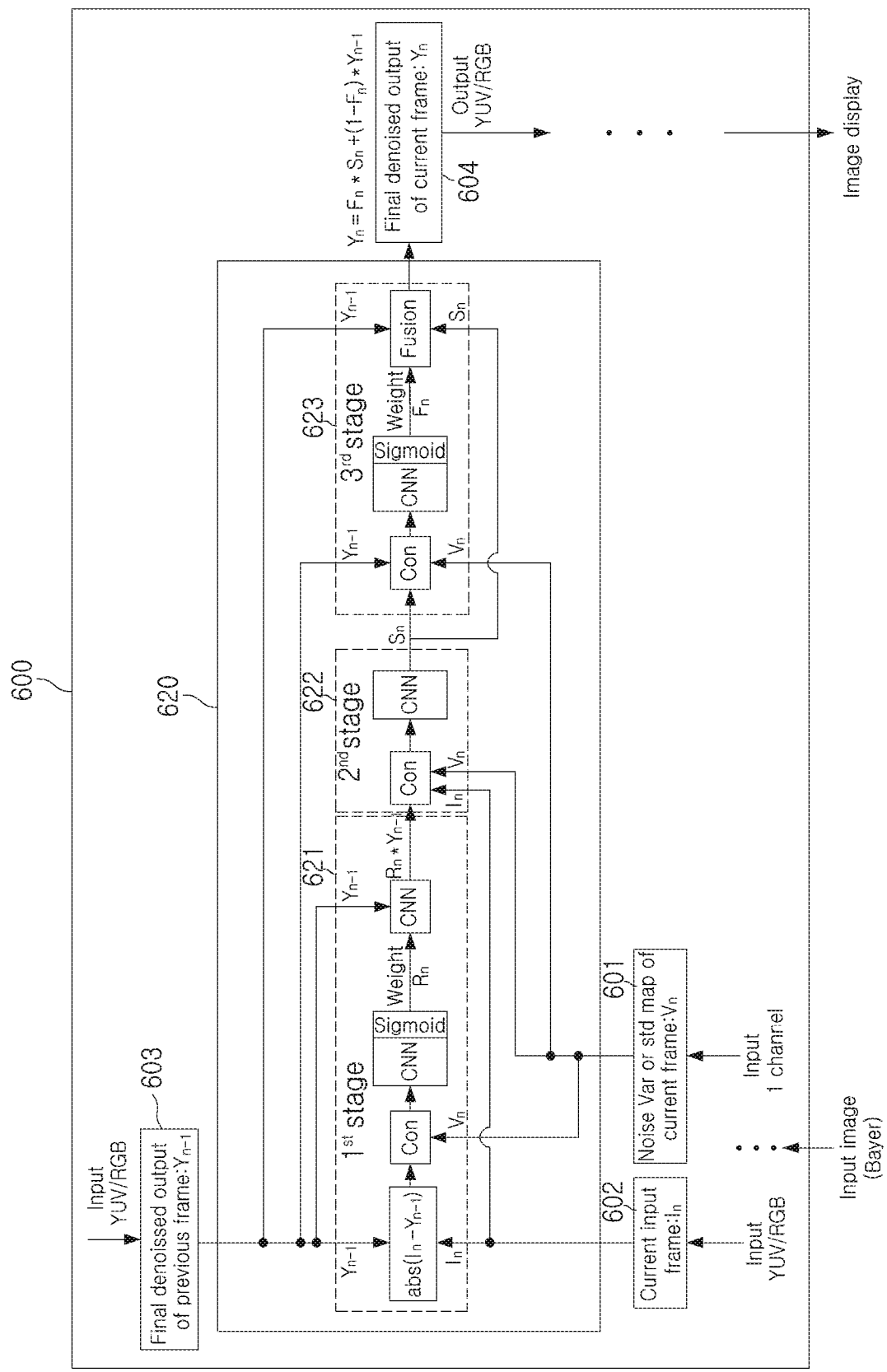
FIG. 6A is a diagram illustrating an image processing process of an image processing device according to an example embodiment.

FIG. 6A is a diagram illustrating an image processing process of an image processing device 600 according to an example embodiment. Referring to FIG. 6A, the image processing device 600 may include a first input buffer 601, a second input buffer 602, a third input buffer 603, an output buffer 604, and a denoising module 620.

The first input buffer 601 may store a noise variance/standard deviation map ($V_n$) for the current frame.

The second input buffer 602 may store the current frame $I_n$. In an example embodiment, the current frame $I_n$ may be YUV/RGB data.

The third input buffer 603 may store the last denoised output ($Y_{n-1}$) of the previous frame.

The output buffer 604 may store the final denoised output ($Y_n=F_n*S_n+(1-F_n)*Y_{n-1}$) of the current frame. In an example embodiment, the denoised frame may be YUV/RGB data.

The denoising module 620 may include a first stage network unit 621, a second stage network unit 622, and a third stage network unit 623.

The first stage network unit 621 may be implemented as the first stage network unit 111-1 illustrated in FIG. 3. The first stage network unit 621 may use CNN and sigmoid activation function to predict the gate weight $R_n$ to represent the useful content of the output of the previous frame $Y_{n-1}$. The first stage network unit 621 may output the weighted output $R_{-n}*Y_{n-1}$ of the previous frame by using, as inputs, the absolute value of a difference ($abs(I_n-Y_{n-1})$) between the noise dispersion ($V_n$) of the current frame and the output ($Y_{n-1}$) of the previous frame and the current frame ($I_n$). In an example embodiment, the first stage network unit 621 may be applied to concatenated data comprising four channels and output data comprising three channels.

The second stage network unit 622 may be implemented as the second stage network unit 111-2 illustrated in FIG. 4. The second stage network unit 622 receives the weighted output ($R_n*Y_{n-1}$) of the previous frame weighted using CNN, and fuses the current frame ($I_n$) and the noise dispersion ($V_n$), thereby generating an initial fused image $S_n$. In an example embodiment, the second stage network unit 622 may include seven input channels and three output channels.

According to some embodiments, generating the initial fused image includes concatenating the current frame, the noise dispersion map, and the weighted first denoised frame to obtain second concatenated data; and generating the initial fused image based on the second concatenated data using the second neural network. The noise dispersion map comprises one channel, the current frame comprises three channels, the weighted first denoised frame comprises three channels, and the second concatenated data comprises seven channels.

The third stage network unit 623 may be implemented as the third stage network unit 111-3 illustrated in FIG. 5. The third stage network unit 623 predicts the fusion weight $F_n$ using the CNN and the sigmoid activation function, and may output the final denoised value ($F_n*S_n+(1-F_n)*Y_{n-1}$) of the current frame, by fusing the initial result of the initial fused image $S_n$ and the output $Y_{n-1}$ of the previous frame. In an example embodiment, the third stage network unit 623 may have input data comprising seven channels and output data comprising three channels.

The image processing apparatus 600 described above may perform recurrent 3-stage gradual temporal fusion for video/multi-frame noise removal. The image processing device 600 may receive an input image and patch the image. In an example embodiment, the input image may be a Bayer pattern image. In an example embodiment, the image patch may be a portion or an entire region of an input image of the image processing device 600. Images processed by the image processing device 600 may be stored in a memory device or transmitted to a display device. Then, the display device may display the processed image.

According to some embodiments, the gate weight $R_n$ generated in the first stage network unit may optionally be used to generate the fusion weight $F_n$ in the third stage network unit.

Figure 6B:
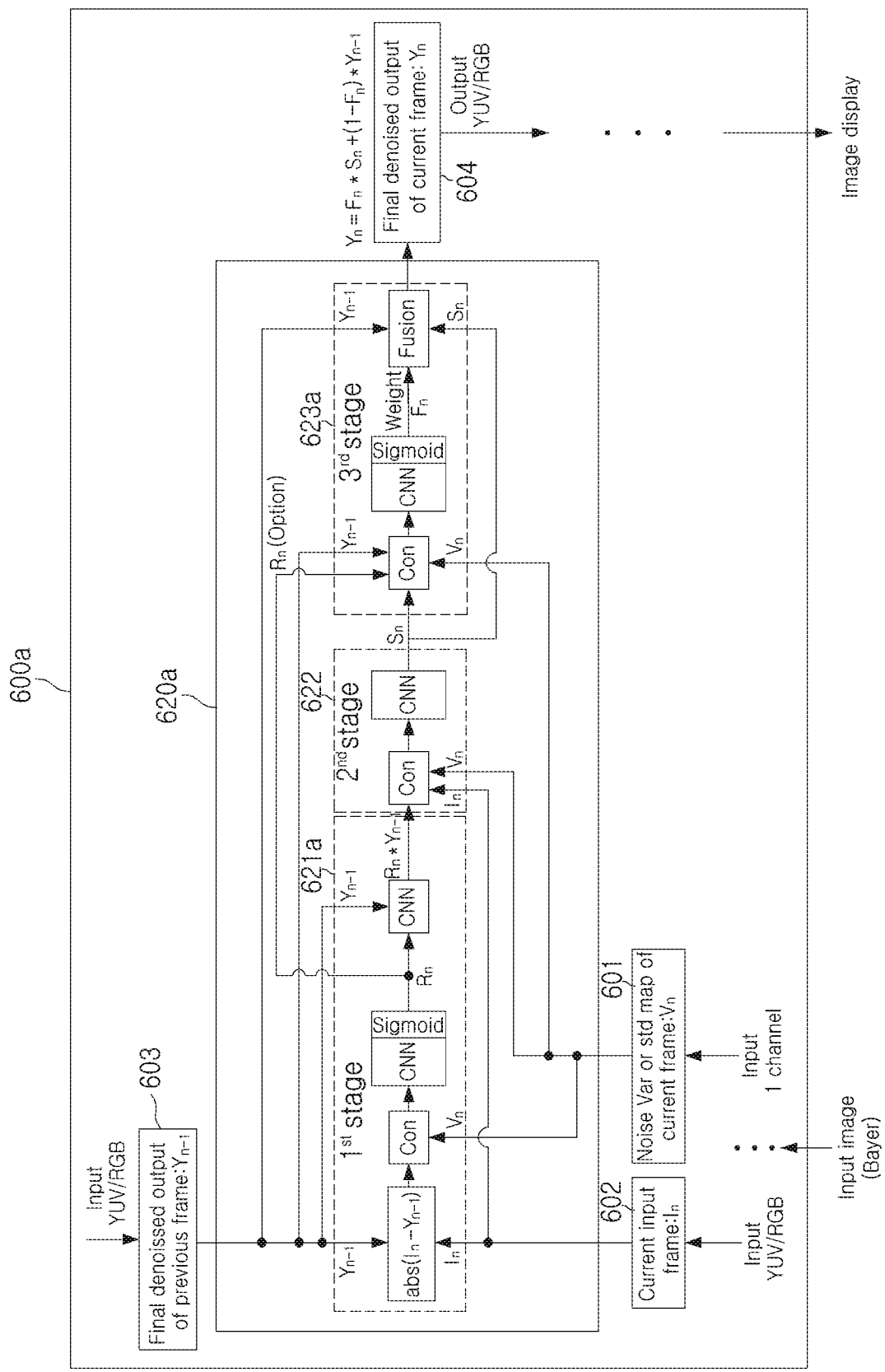
FIG. 6B is a diagram illustrating an image processing process of an image processing device according to an example embodiment.

FIG. 6B is a diagram illustrating an image processing process of an image processing device 600a according to another embodiment of the present disclosure of the present disclosure. The image processing device 600a illustrated in FIG. 6B may include a denoising module 620a that optionally uses gate weights $R_n$ generated in the first stage network unit 621a to generate fusion weights $F_n$ in the third stage network unit 623a, compared to the image processing device 600 illustrated in FIG. 6A.

The concatenation unit Con of the third stage network unit 623a may be implemented to concatenate a gate weight map ($R_n$) optionally output from the first stage network unit 621a, an initial fused image ($S_n$) output from the second stage network unit 622, a current frame ($I_n$) and a noise dispersion ($V_n$). The CNN unit may be implemented to perform convolutional operations on the output of the concatenation unit Con. The activation function unit may be implemented to output a fusion weight ($F_n$) for the output of the CNN unit using a sigmoid activation function. The fusion unit receives the initial fused image ($S_n$), the previous output frame ($Y_{n-1}$), and the fusion weight ($F_n$), and may be implemented to output the final denoised value ($Y_n=F_n*S_n+(1-F_n)*Y_{n-1}$) of the current frame ($I_n$).

Figure 7:
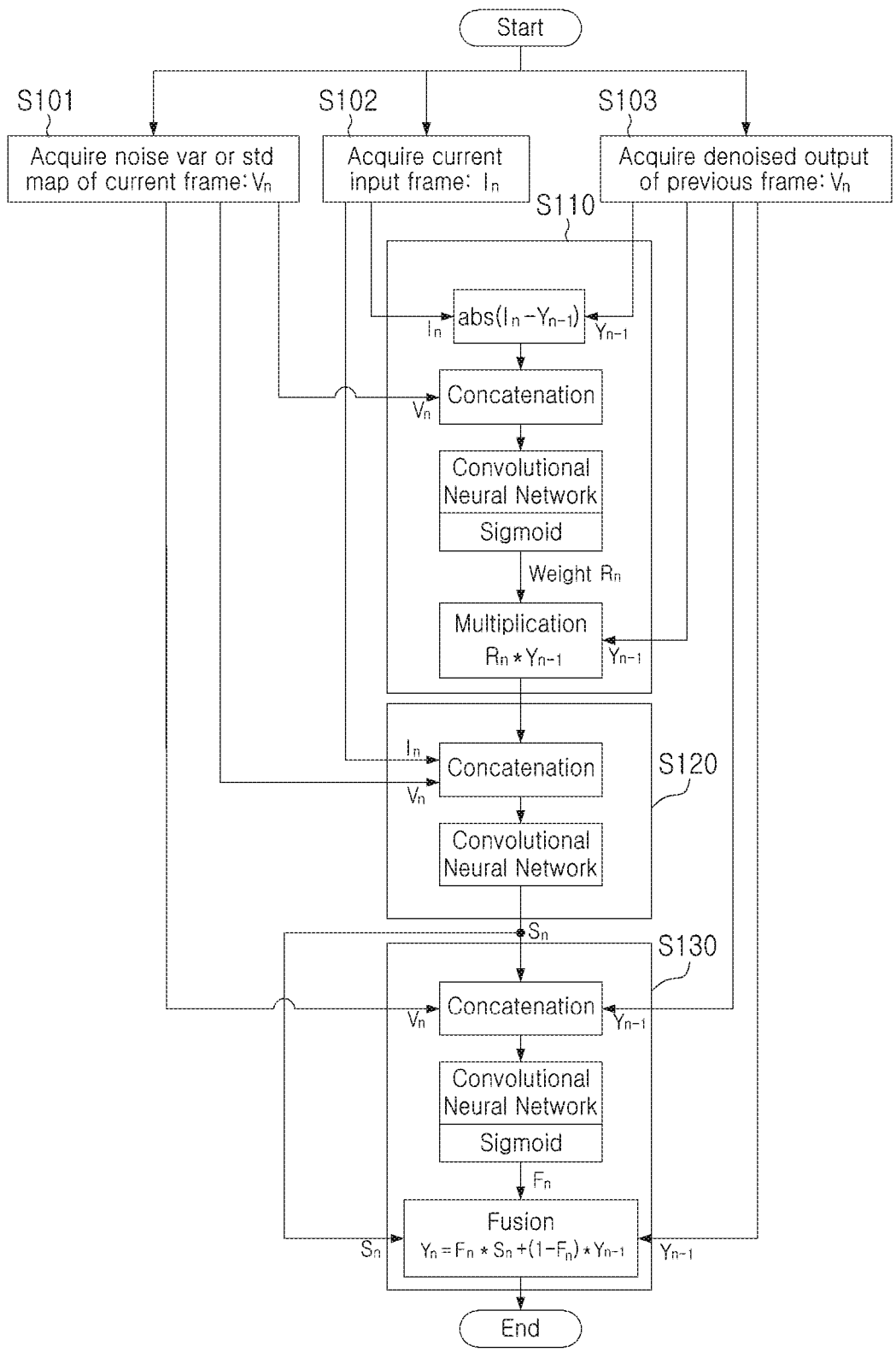
FIG. 7 is a flowchart illustrating a method of operating an image processing device according to an example embodiment.

FIG. 7 is a flowchart illustrating a method of operating an image processing device according to an example embodiment. Referring to FIGS. 1 to 7, the image processing device may proceed as follows.

The image processing device 100 may obtain a noise standard deviation map (or variance map) ($V_n$) of the current frame (S101), acquire the current frame ($I_n$) (S102), and acquire an output ($Y_{n-1}$) from which the noise of the previous frame has been removed. Thereafter, a 3-stage gradual temporal fusion process may proceed. In the first stage S110, the weighted output ($R_n*Y_{n-1}$) of the previous frame may be generated. The first stage network unit 111-1 (see FIG. 2) may calculate the absolute value of a difference ($abs(I_n-Y_{n-1})$) between the current frame ($I_n$) and the output of the previous frame ($Y_{n-1}$), and may concatenate a 1-channel noise map ($V_n$) and a 3-channel abs ($I_n-Y_{n-1}$) into 4-channel data. Thereafter, the first stage network unit 111-1 may process the input 4-channel data through the CNN and the Sigmoid activation function, and output a weight value $R_n$. Then, the first stage network unit 111-1 may generate a weighted output ($R_n*Y_{n-1}$) of the previous frame by multiplying the gate weight map ($R_n$) by the output ($Y_{n-1}$) of the previous frame.

In the second stage S120, an initial fused image $S_n$ may be generated. The second stage network unit 111-2 (see FIG. 2) may concatenate the 1-channel noise map ($V_n$), the 3-channel current frame ($I_n$), and the 3-channel, and produce a weighted output ($R_n*Y_{n-1}$) of the first stage (S110) with 7-channel data. Then, the second stage network unit 111-2 may process the 7-channel data input through the CNN and output an initial fused image ($S_n$) of the 3-channel.

In the third stage (S130), a final denoised output ($Y_n=F_n*S_n+(1-F_n)*Y_{n-1}$) of the current frame may be generated. In an example embodiment, the stage network unit 111-3 (see FIG. 2) may concatenate the 1-channel noise map ($V_n$), the output ($Y_{n-1}$) of the 3-channel previous frame, and the output ($S_n$) of the second stage (S120) of the 3-channel with 7-channel data. In another embodiment, the stage network unit 111-3 (see FIG. 2) may concatenate the 1-channel noise map ($V_n$), the output ($Y_{n-1}$) of the 3-channel previous frame, the gate weight map ($R_n$) of the first stage (S110) of the 3-channel, the output ($S_n$) of the second stage (S120) of the 3-channel with 10-channel data. The third stage network unit 111-3 may process 7-channel data input through CNN and sigmoid activation function, and output a fusion weight ($F_n$). The third stage network unit 111-3 fuses the output ($S_n$) of the second stage (S120) of the 3-channel and the output ($Y_{n-1}$) of the previous frame of the 3-channel, and ultimately, generate a denoised output ($Y_n=F_n*S_n+(1-F_n)*Y_{n-1}$) for the current frame $I_n$.

According to some embodiments, the present disclosure is applicable to electronic devices.

Figure 8:
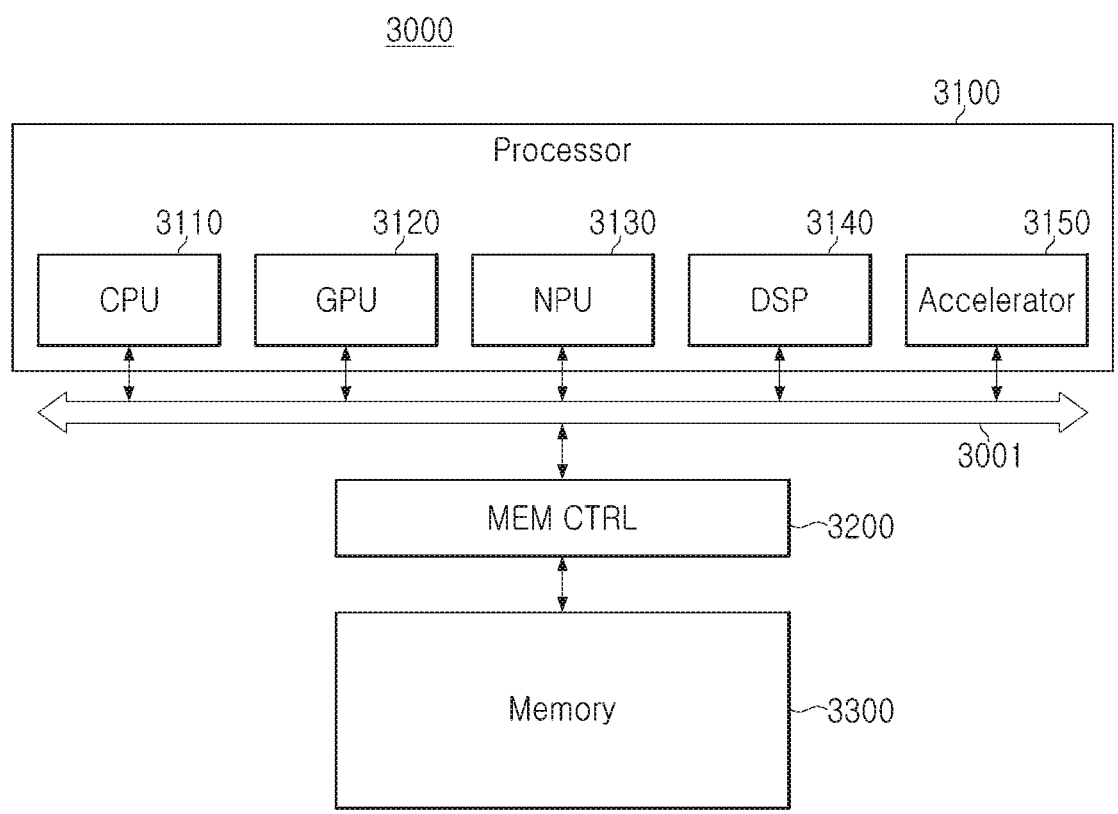
FIG. 8 is a diagram illustrating an electronic device according to an example embodiment.

FIG. 8 is a diagram illustrating an electronic device 3000 according to an example embodiment. Referring to FIG. 8, the electronic device 3000 may execute a neural network model. A neural network model is a model of a learning method in which the human brain processes information, and may refer to a model capable of accurately recognizing and discriminating objects or specific information from more than one user data such as voice, image, and video.

The electronic device 3000 may be a mobile system such as a mobile phone, a smart phone, a tablet personal computer (PC), a wearable device, a healthcare device, or an internet of things (JOT) device. However, the electronic device 3000 is not necessarily limited to a mobile system, and may be an automotive device such a navigation device, a personal computer, a laptop computer, a server, a media player, or the like.

The electronic device 3000 may include a system bus 3001, a processor 3100, a memory controller 3200, and a memory device 3300. The system bus 3001 may support communication between the processor 3100, the memory controller 3200, and the memory device 3300.

The processor 3100 may perform a neural network operation using data stored in the memory device 3300. For example, the neural network operation may include an operation of reading data and weights for each node included in the neural network model, performing a convolution operation on the data and weights, and storing or outputting an operation result. In some examples, the processor 3100 performs recurrent 3-stage gradual temporal fusion using a Convolutional Neural Network (CNN) as described in FIGS. 1 to 7, thereby effectively removing noise while preserving the details of the image.

Also, the processor 3100 may include heterogeneous computing devices that perform data processing and calculations, such as Central Processing Unit (CPU) 3110, Graphic Processing Unit (GPU) 3120, Neural Processing Unit (NPU) 3130, Digital Signal Processor (DSP) 3140, an accelerator 3150, and the like. In some examples, the CPU 3110 may be a highly versatile computing device. The GPU 3120 may be an arithmetic unit optimized for parallel computation such as graphic processing. The NPU 3130 may be an arithmetic unit optimized for neural network arithmetic operation and may include logic blocks for executing the unit operation mainly used in neural network operations, such as convolution operations. The DSP 3140 may be a computing device optimized for real-time digital processing of analog signals. Also, the accelerator 3150 may be an arithmetic device for quickly performing a specific function.

Also, when the processor 3100 executes the neural network model, more than one hardware devices may operate together. For example, to execute a neural network model, not only the NPU 3130 but also heterogeneous computing devices such as the CPU 3110 and the GPU 3120 may operate together. In addition, the memory controller 3200 and the data bus 3001 may operate to read input data of the neural network model and store output data.

The memory device 3300 may store data necessary for the processor 3100 to perform a neural network operation. For example, one or more neural network models that may be executed by the processor 3100 may be loaded into the memory device 3300. Also, input data and output data of the neural network model may be stored in the memory device 3300. The memory device 3300 may include volatile memory such as dynamic random access memory (DRAM), synchronous DRAM (SDRAM), static RAM (SRAM), and resistive RAM (RRAM), and may also include non-volatile memory such as flash memory.

The memory controller 3200 may control an operation of storing data received from the processor 3100 in the memory device 3300 and an operation of outputting data stored in the memory device 3300 to the processor 3100.

Figure 9:
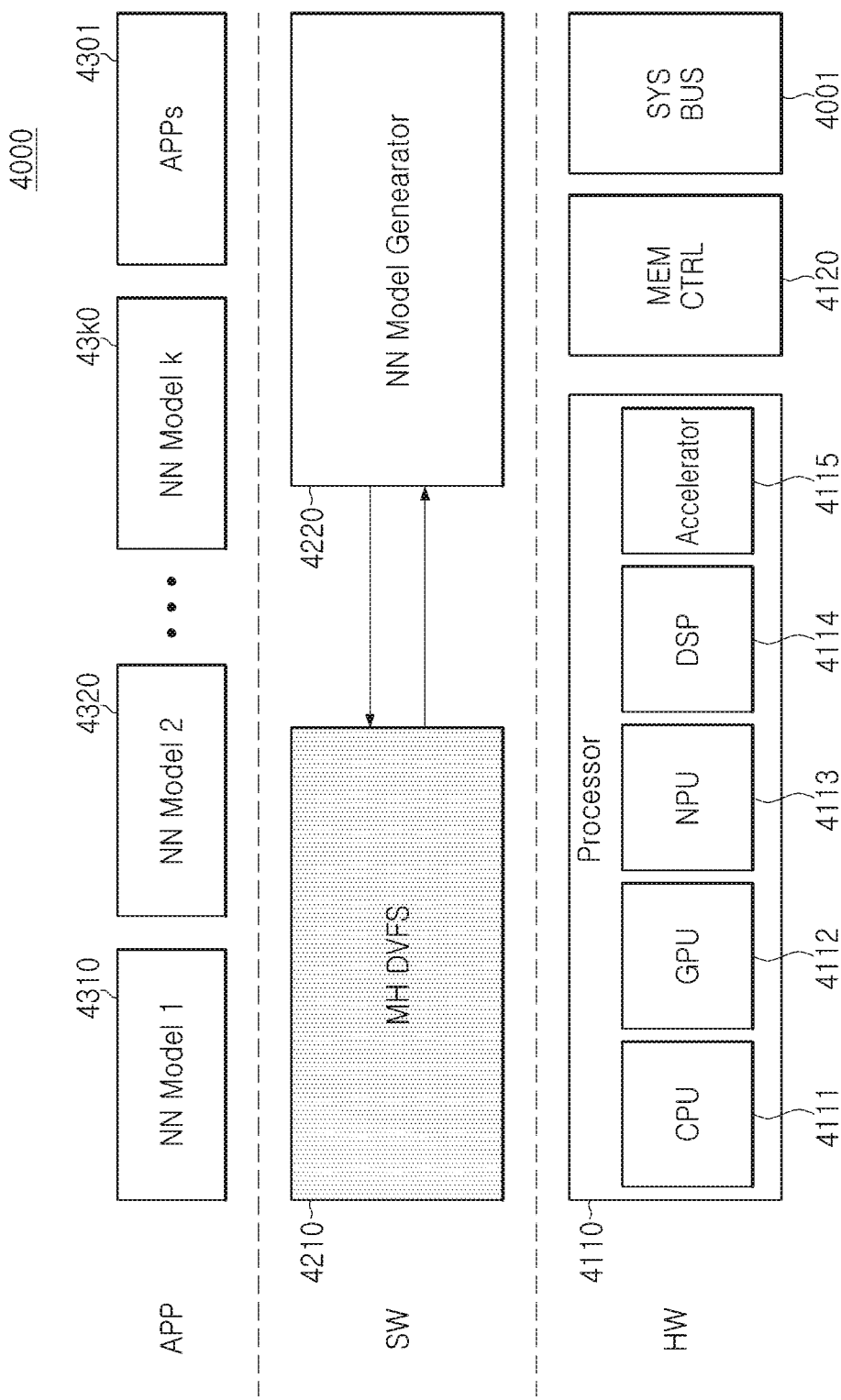
FIG. 9 is a diagram illustrating a program module according to an example embodiment.

FIG. 9 is a diagram illustrating a hierarchical structure of an electronic device according to an example embodiment. Referring to FIG. 9, an electronic device 4000 may include a hardware layer (HW), a system software layer (SW), and an application layer (APP).

The hardware layer (HW) is the lowest hierarchy of the electronic device 4000 and may include hardware devices such as a system bus 4001, a processor 4110, and a memory controller 4120. The processor 4110 may include heterogeneous computing units, for example, CPU 4111, GPU 4112, NPU 4113, DSP 4114, and other accelerators 4115.

The system software layer (SW) may manage hardware devices of the hardware layer (HW) and provide an abstracted platform. For example, the system software layer (SW) may run a Linux-like kernel.

The system software layer (SW) may include an MH-DVFS 4210 and a neural network model executor 4220. The MH-DVFS 4210 may determine operating frequencies of hardware devices for each memory layer using microarchitectural information. The neural network model executor 4220 may execute the neural network model using hardware devices operating at an operating frequency determined by the MH-DVFS 4210. In addition, the neural network model executor 4220 may output the actual execution time of the neural network model as a result of executing the neural network model. Also, the system software layer (SW) may be driven by the processor 4110. For example, the system software layer (SW) may be driven by the CPU 4111. However, it should be understood that the computing device including the system software layer (SW) is not limited to the CPU 4111.

The application layer (APP) may be executed on the system software layer (SW), and may include a plurality of neural network models (4310 to 43$k$0, where k is an integer greater than or equal to 2) and other applications 4301. For example, the other applications 4301 may include a camera application. A plurality of neural network models 4310-43$k$0) may include a model for detecting an object included in an image frame obtained by a camera application, a model identifying what the detected object is, a model for detecting a target area in the image frame, a model for identifying the detected target region, a model that classifies the identified target areas according to meaning, such as people, cars, and trees, and the like. However, it should be understood that the types of neural network models and other applications are not limited thereto.

Figure 10:
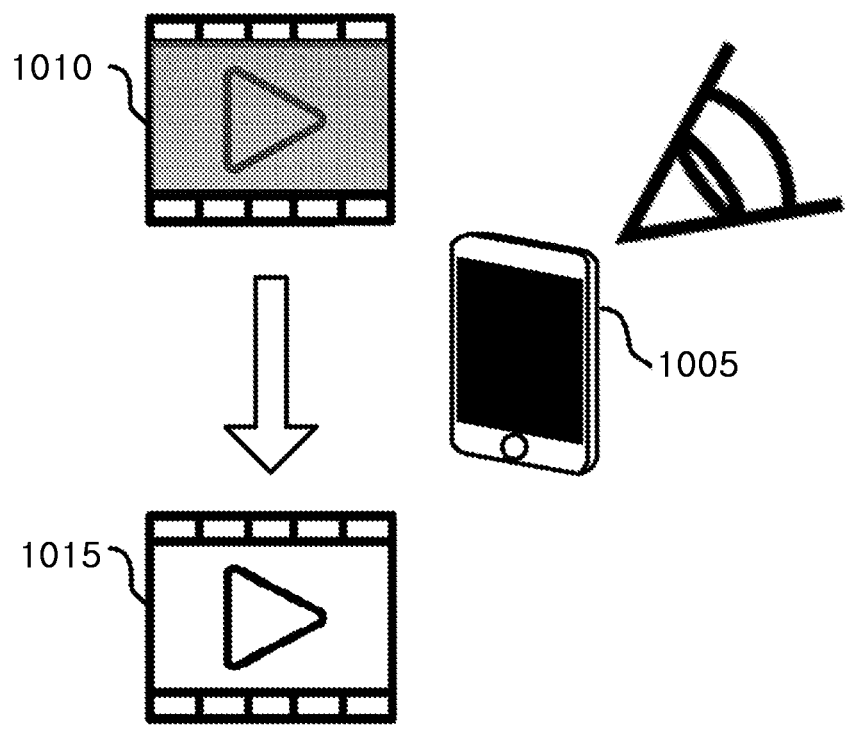
FIG. 10 illustrates an electronic device according to an example embodiment.

FIG. 10 illustrates an image processing system 1000. The image processing system 1000 may include an electronic device 1005 that captures a noisy multi-frame image 1010 (e.g., a video) and outputs a clear multi-frame image 1015. The electronic device 1005 may be a mobile system such as a mobile phone, a smart phone, personal computer (PC), a tablet, a wearable device, etc.

The electronic device 1005 may apply one or more neural networks capable of performing multiple image processing tasks on the noisy multi-frame image 1010 with limited hardware resources (e.g., limited processor or memory resources). The electronic device 1005 may be an example of the image processing apparatus described with reference to FIGS. 1-9, and may perform the methods described herein.

In one example, the electronic device 1005 may include a camera. The camera may capture the noisy multi-frame image 1010. In some cases, training data (e.g., training images for one or more image processing tasks) for training the neural networks is stored at a database external to the electronic device 1005, and a neural network located within the electronic device 1005 may be trained by an external computing device and parameters for the neural network may be transferred to the electronic device 1005 and stored in a memory.

Figure 11:
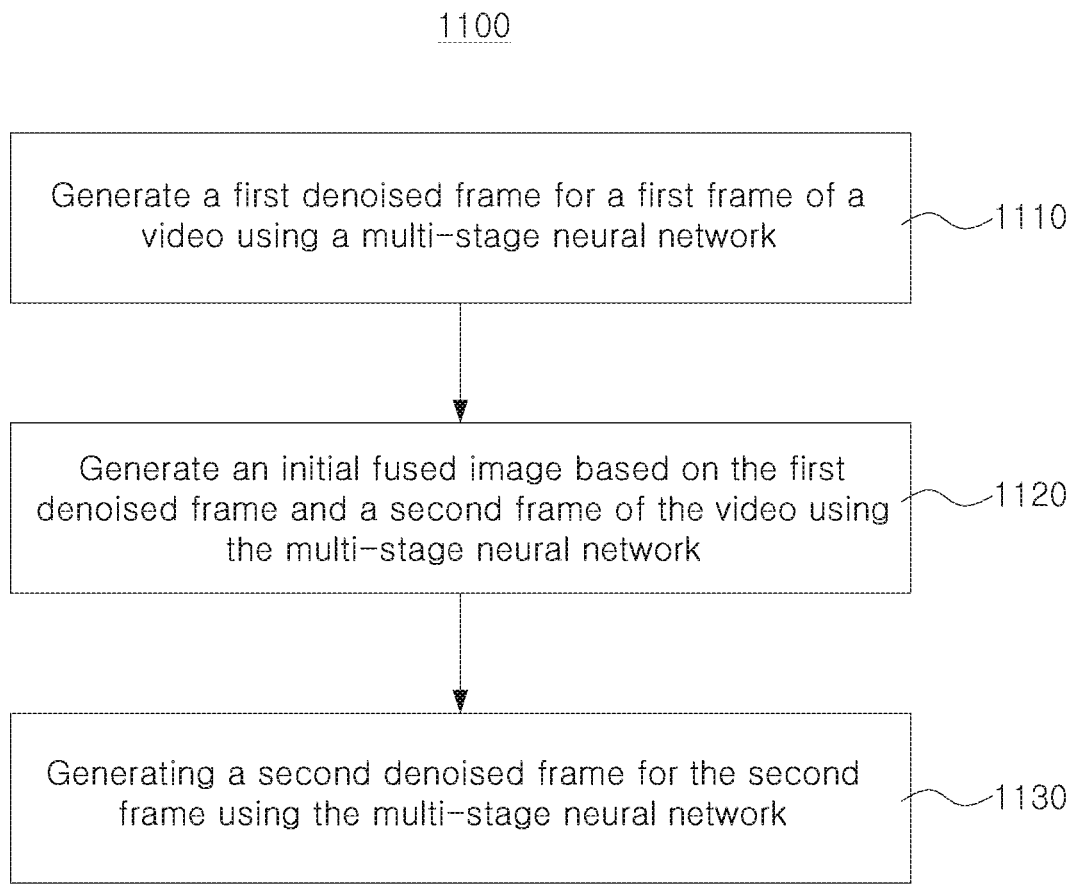
FIG. 11 illustrates a method for image processing according to an example embodiment.

FIG. 11 illustrates a method 1100 for image processing according to an example embodiment. In some examples, these operations are performed by a system, such as image processing device 100 or electronic device 1005, including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1110, the system generates a first denoised frame for a first frame of a video using a multi-stage neural network. In some examples, the first frame is a one of multiple frames in a multi-frame image or video. In some examples, the multi-stage neural network is a 3-stage neural network.

At operation 1120, the system generates an initial fused image based on the first denoised frame and a second frame of the video using the multistage neural network. The second frame may be a part of the same multi-frame image or video as the first frame. The fused image can include features based on the second frame and based on the first denoised frame.

At operation 1130, the system generates a second denoised frame for the second frame using the multi-stage neural network. For example, the second denoised frame can be generated by the multi-stage neural network in a manner similar to the first denoised frame (i.e., a denoised frame can be generated for each of a plurality of frames, whether it is each frame in a multi-frame image or video, or each one of a selected number of frames in the multi-frame image or video).

Figure 12:
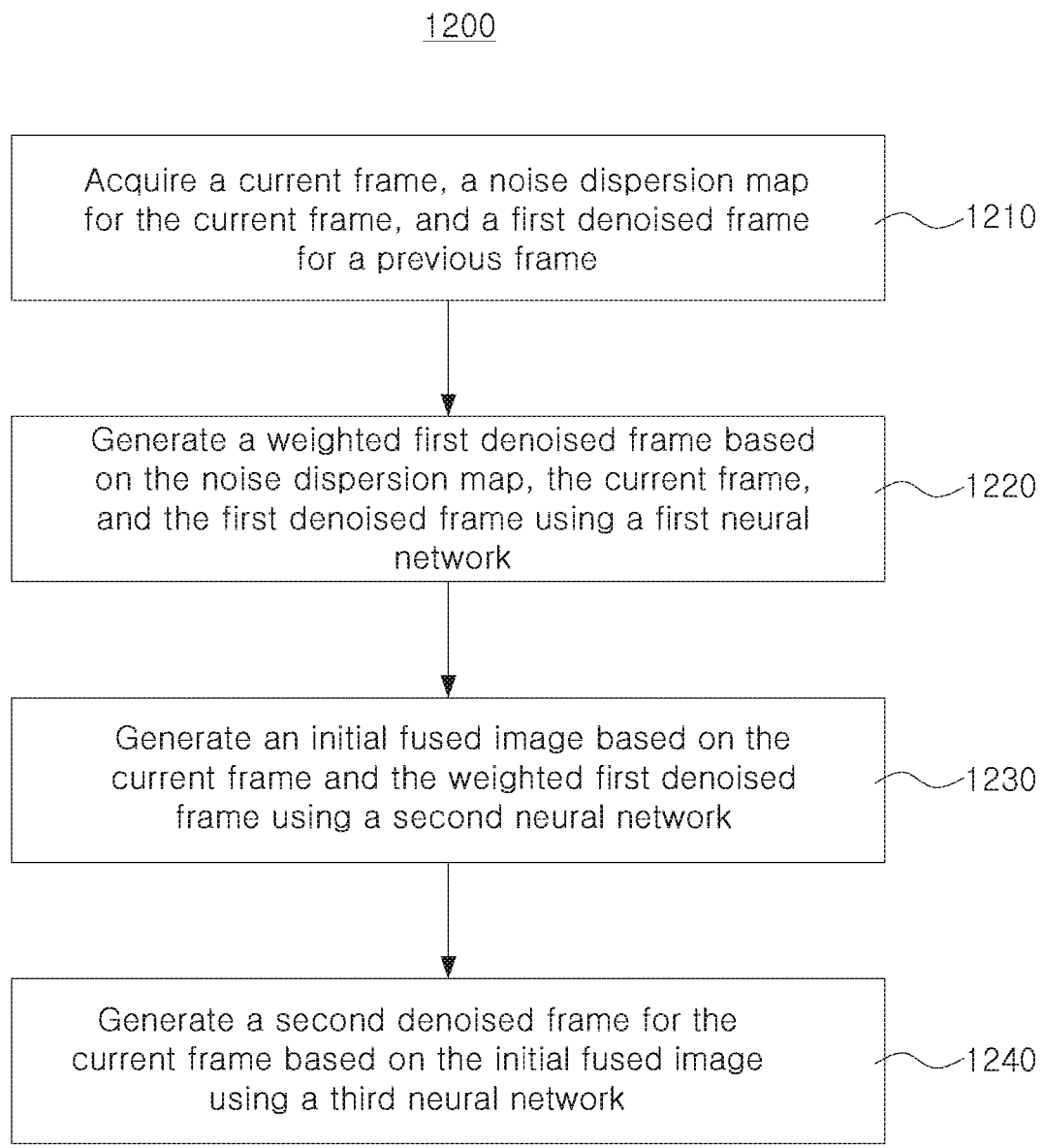
FIG. 12 illustrates a method for image processing according to an example embodiment.

FIG. 12 illustrates a method 1200 for image processing according to an example embodiment. In some examples, these operations are performed by a system—such as image processing device 100 or electronic device 1005, including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1210, the system acquires a current frame, a noise dispersion map for the current frame, and a first denoised frame for a previous frame. For example, the current frame can be obtained from a camera, the first noise dispersion map can be computed based on the current frame, and the first denoised frame can be obtained from a previous frame from the camera.

At operation 1220, the system generates a weighted first denoised frame based on the noise dispersion map, the current frame, and the first denoised frame using a first neural network. The first neural network can be a part of a multi-stage neural network.

At operation 1230, the system generates an initial fused image based on the current frame and the weighted first denoised frame using a second neural network. The second neural network can be a part of the same multi-stage neural network as the first neural network, and can take the output of the first neural network as an input.

At operation 1240, the system generates a second denoised frame for the current frame based on the initial fused image using a third neural network. The third neural network can be a part of the same multi-stage neural network as the first neural network and the second neural network and can take an output of the second neural network as an input.

According to some embodiments, other applications may be simultaneously executed when the neural network model is executed, and a plurality of neural network models may be simultaneously executed. For example, when the electronic device 4000 is a mobile system, a neural network model for detecting an object may be executed simultaneously with executing a camera application.

According to some embodiments, the term "module" used herein may refer to a unit including one or a combination of two or more of, for example, hardware, software, or firmware. A "module" may be interchangeably used with terms such as, for example, a unit, logic, logical block, component, or circuit. A "module" may be a minimum unit or a portion of an integrally formed component. A "module" may be a minimal unit or a portion thereof that performs one or more functions. A "module" may be implemented mechanically or electronically.

For example, a "module" may include at least one of a known or future developed application-specific integrated circuit (ASIC) chip, field-programmable gate arrays (FPGAs), or programmable-logic device that performs certain operations. At least some of the devices (e.g., modules or functions thereof) or methods (e.g., operations) according to an embodiment may be implemented, for example, as instructions stored in a computer-readable storage medium in the form of a program module. When an instruction is executed by a processor, one or more processors may perform a function corresponding to the instruction. A computer-readable storage medium may be, for example, a memory.

A computer-readable recording medium may include hard disk, floppy disk, magnetic media (e.g., magnetic tape), optical media (e.g., CD-ROM, DVD (Digital Versatile Disc), magneto-optical media (e.g., floptical disk), a hardware device (e.g., ROM, RAM, a flash memory, or the like), and the like. In addition, the program command may include high-level language codes that may be executed by a computer using an interpreter or the like as well as machine language codes generated by a compiler. The hardware device described above may be configured to operate as one or more software modules to perform operations of embodiments, and vice versa.

A module or program module according to an example embodiment may include at least one or more of the aforementioned components, some may be omitted, or additional components may be further included. Operations performed by modules, program modules, or other components according to embodiments may be executed in a sequential, parallel, repetitive, or heuristic manner. Also, some operations may be performed in a different order or omitted, or other operations may be added.

The denoising technique using recurrent 3-stage gradual temporal fusion according to an example embodiment may effectively remove noise while maintaining image details. For example, the denoising technique of the present disclosure may further remove noise from a local motion object and a surrounding area thereof. Thus, in an example embodiment of the present disclosure, color artifacts may be further reduced.

According to some embodiments, regarding the temporal noise reduction (TNR), noise variance/standard deviation of the current frame may be included in a corresponding input signal in addition to outputs of the current frame and the previous frame. This noise variance/standard deviation may be manually adjusted via the ISP configuration file or by setting the camera ISO value (in the camera's manual mode). In some cases, the noise variance or standard deviation of the TNR may be set to a value greater than the correct value, and the resulting video frames may have noticeably over-enhanced textures and edges. As the noise variance/standard deviation value becomes larger than the correct value, over-emphasized textures and edges become increasingly severe. In some cases, the noise variance/standard deviation may be set to a maximum value of an image pixel (e.g., the maximum value for a 12-bit image is 4095), and the over-enhanced textures and edges may have a relief effect. In the case in which the parameter configuration file of the TNR module may be modified, the noise standard deviation may be set to the maximum value (e.g., 4095 is the maximum value for 12-bit image) and may analyze whether the ISP output video frames are exceeded. According to some embodiments, in the case in which the TNR module's parameter configuration file cannot be modified, the camera's manual mode may be used to shoot a video in a normal lighting scene and adjust the ISO to the maximum value. Then, the noise standard deviation setting is automatically set to the maximum value. The last captured video frame may be analyzed for over-enhanced textures and edges.

As set forth above, in an image processing device, an electronic device having the same, and an operating method thereof according to an example embodiment, noise may be effectively removed while maintaining details of an image using recurrent 3-stage gradual temporal fusion.

While example embodiments have been illustrated and described above, it will be apparent to those skilled in the art that modifications and variations could be made without departing from the scope of the present disclosure as defined by the appended claims.

What is claimed is:

1. A method comprising:
   acquiring a current frame, a noise dispersion map for the current frame, and a first denoised frame for a previous frame;
   generating a weighted first denoised frame based on the noise dispersion map, the current frame, and the first denoised frame using a first neural network;
   generating an initial fused image based on the current frame and the weighted first denoised frame using a second neural network; and
   generating a second denoised frame for the current frame based on the initial fused image using a third neural network.

2. The method of claim 1, wherein at least one of the first neural network, the second neural network, and the third neural network includes a Convolutional Neural Network (CNN).

3. The method of claim 1, wherein the generating the weighted first denoised frame includes:
calculating an absolute value of a difference between the current frame and the first denoised frame;
concatenating the absolute value and the noise dispersion map to obtain first concatenated data;
calculating a weight map based on the first concatenated data using the first neural network; and
multiplying the weight map by the first denoised frame to output the weighted first denoised frame.

4. The method of claim 3, wherein the noise dispersion map comprises one channel, the absolute value comprises three channels, and the first concatenated data comprises four channels.

5. The method of claim 4, wherein the generating the weighted first denoised frame includes applying the first neural network to the four channels of the first concatenated data.

6. The method of claim 1, wherein the first neural network includes a sigmoid activation function.

7. The method of claim 1, wherein the generating the initial fused image includes:
concatenating the current frame, the noise dispersion map, and the weighted first denoised frame to obtain second concatenated data; and
generating the initial fused image based on the second concatenated data using the second neural network.

8. The method of claim 7, wherein the noise dispersion map comprises one channel, the current frame comprises three channels, the weighted first denoised frame comprises three channels, and the second concatenated data comprises seven channels.

9. The method of claim 1, wherein the generating the second denoised frame for the current frame includes:
concatenating the noise dispersion map, the initial fused image, and the first denoised frame to obtain third concatenated data;
calculating a fusion weight map based on the third concatenated data using the third neural network; and
fusing the initial fused image, the fusion weight, and the first denoised frame to generate the second denoised frame for the current frame.

10. The method of claim 9, wherein the noise dispersion map comprises one channel, the first denoised frame comprises three channels, the initial fused image comprises three channels, and the third concatenated data comprises seven channels.

11. An image processing device comprising:
a processor configured to execute a denoising module; and
a memory device configured to store the denoising module,
wherein the denoising module includes:
a first neural network for generating a weighted frame for a denoised frame for a previous frame;
a second neural network for generating an initial fused image for the weighted frame using a current frame and the weighted frame; and
a third neural network for fusing the current frame, the initial fused image, and the denoised frame for the previous frame.

12. The image processing device of claim 11, wherein the denoised frame for the previous frame comprises three channels, the current frame comprises three channels, a noise dispersion map for the current frame comprises one channel, and the weighted frame comprises three channels.

13. The image processing device of claim 12, wherein the current frame comprises three channels, the weighted frame comprises three channel, and the noise dispersion map comprises one channel, and the initial fused image comprises three channel.

14. The image processing device of claim 13, wherein the fused image comprises three channels, the denoised frame for the previous frame comprises three channels, and the noise dispersion map comprises one channel, and a denoised frame for the current frame comprises three channels.

15. The image processing device of claim 11, further comprising:
a first input buffer storing a noise dispersion map;
a second input buffer storing the current frame;
a third input buffer storing the denoised frame for the previous frame; and
an output buffer storing a denoised frame for the current frame.

16. An electronic device comprising:
a memory device configured to store a denoising module removing video/multi-frame noise;
a memory controller configured to control the memory device; and
a processor configured to execute the denoising module removing noise from an input image,
wherein the denoising module performs a recurrent three-stage gradual temporal fusion using a convolutional neural network (CNN).

17. The electronic device of claim 16, wherein the denoising module includes a first neural network, a second neural network, and a third neural network.

18. The electronic device of claim 17, wherein the first neural network calculates an absolute value of a difference between first denoised frames for a previous frame and a current frame, concatenates the absolute value with a noise dispersion map for the current frame to obtain first concatenated data, calculates a weight map based on the first concatenated data, and multiplies the weight map by the first denoised frame to output a weighted first denoised frame.

19. The electronic device of claim 18, wherein the second neural network concatenates the current frame, the noise dispersion map, and the weighted first denoised frame to obtain second concatenated data, and outputs an initial fused image based on the second concatenated data.

20. The electronic device of claim 19, wherein the third neural network concatenates the noise dispersion map, the initial fused image, and the first denoised frame to obtain third concatenated data, calculates a fusion weight map based on the third concatenated data, and fuses the initial fused image, the fusion weight map, and the first denoised frame to output a second denoised frame for the current frame.

* * * * *